(12) United States Patent
Mueller

(10) Patent No.: US 6,694,484 B1
(45) Date of Patent: *Feb. 17, 2004

(54) RELATING A HTML DOCUMENT WITH A NON-BROWSER APPLICATION

(75) Inventor: Douglas Brian Mueller, Cary, NC (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 992 days.

(21) Appl. No.: 08/868,201

(22) Filed: Jun. 3, 1997

(51) Int. Cl.$^7$ ................................................. G06F 7/00
(52) U.S. Cl. ....................................................... 715/513
(58) Field of Search ............................ 395/603, 188.01, 395/200.48; 707/513, 500, 501

(56) References Cited

U.S. PATENT DOCUMENTS

| | | | |
|---|---|---|---|
| 5,659,729 A | * | 8/1997 | Nielsen ........................ 395/603 |
| 5,684,951 A | * | 11/1997 | Goldman et al. ........ 395/188.01 |
| 5,893,915 A | * | 4/1999 | Cordell et al. ............... 707/513 |
| 5,898,836 A | * | 4/1999 | Freivald et al. ......... 395/200.48 |
| 5,901,286 A | * | 5/1999 | Danknick et al. ............ 709/203 |
| 6,081,842 A | * | 6/2000 | Shachar ........................ 709/229 |
| 6,101,510 A | * | 8/2000 | Stone et al. ................... 707/513 |

OTHER PUBLICATIONS

Microsoft Word 97 Quick Reference, Winter, QUE Publisher, chapter 5, and chapter 1, p. 1, Apr. 18, 1997.*
Microsoft Word 97 screendump, Fig. 1, 1997.*
Winter, P., Microsoft Word 97 Quick Reference, Apr. 18, 1997, p. 10–31.*
Lemay et al, JavaScript, Sams.net pub., 1996, p. 289–291.*

* cited by examiner

Primary Examiner—Sanjiv Shah
Assistant Examiner—C. Paula
(74) Attorney, Agent, or Firm—Myers Bigel Sibley & Sajovec, P.A.; Edward H. Duffield

(57) ABSTRACT

Systems, methods, and computer program products for relating a hyper-text markup language (HTML) document to stored information associated with the HTML document and with an application program are provided for by an association module that searches the HTML document for an association tag, wherein the association tag includes an index reference to a location of the stored information. Upon locating an association tag, the index reference is read and utilized by the association module to locate and retrieve the stored information. The stored information is then utilized by the application program. The association tag may also include a marker that uniquely identifies it as associated with the application program. In accordance with an aspect of the present invention, the stored information is both document and application specific.

21 Claims, 4 Drawing Sheets

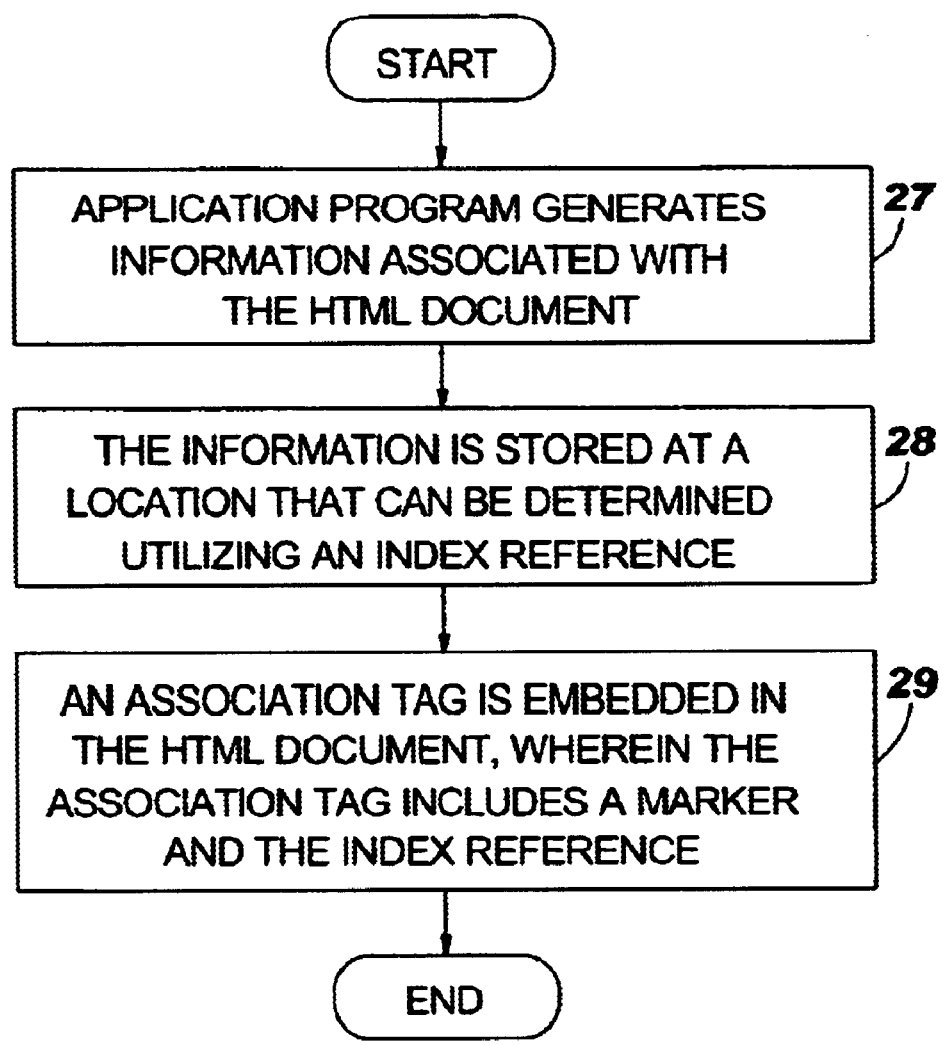

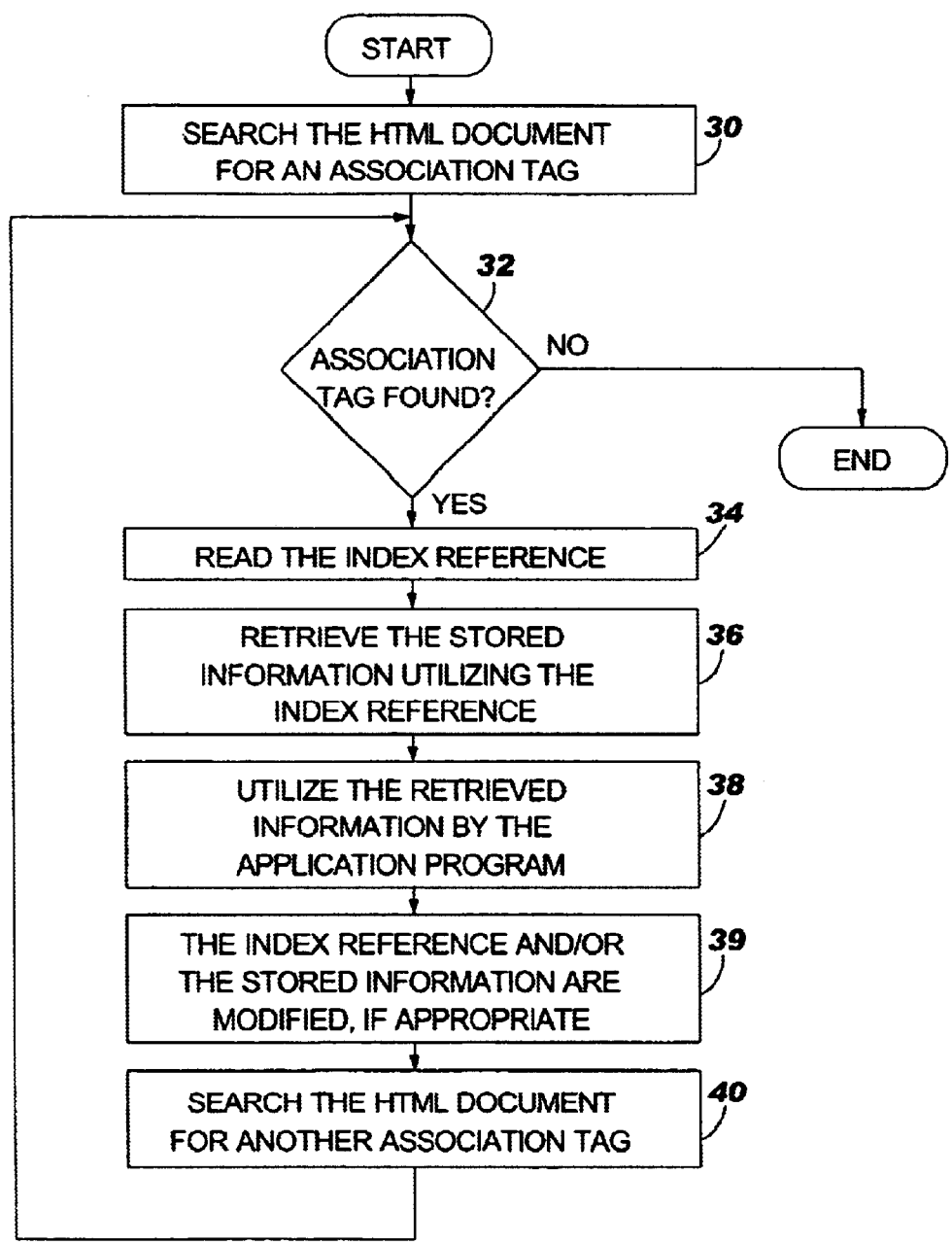

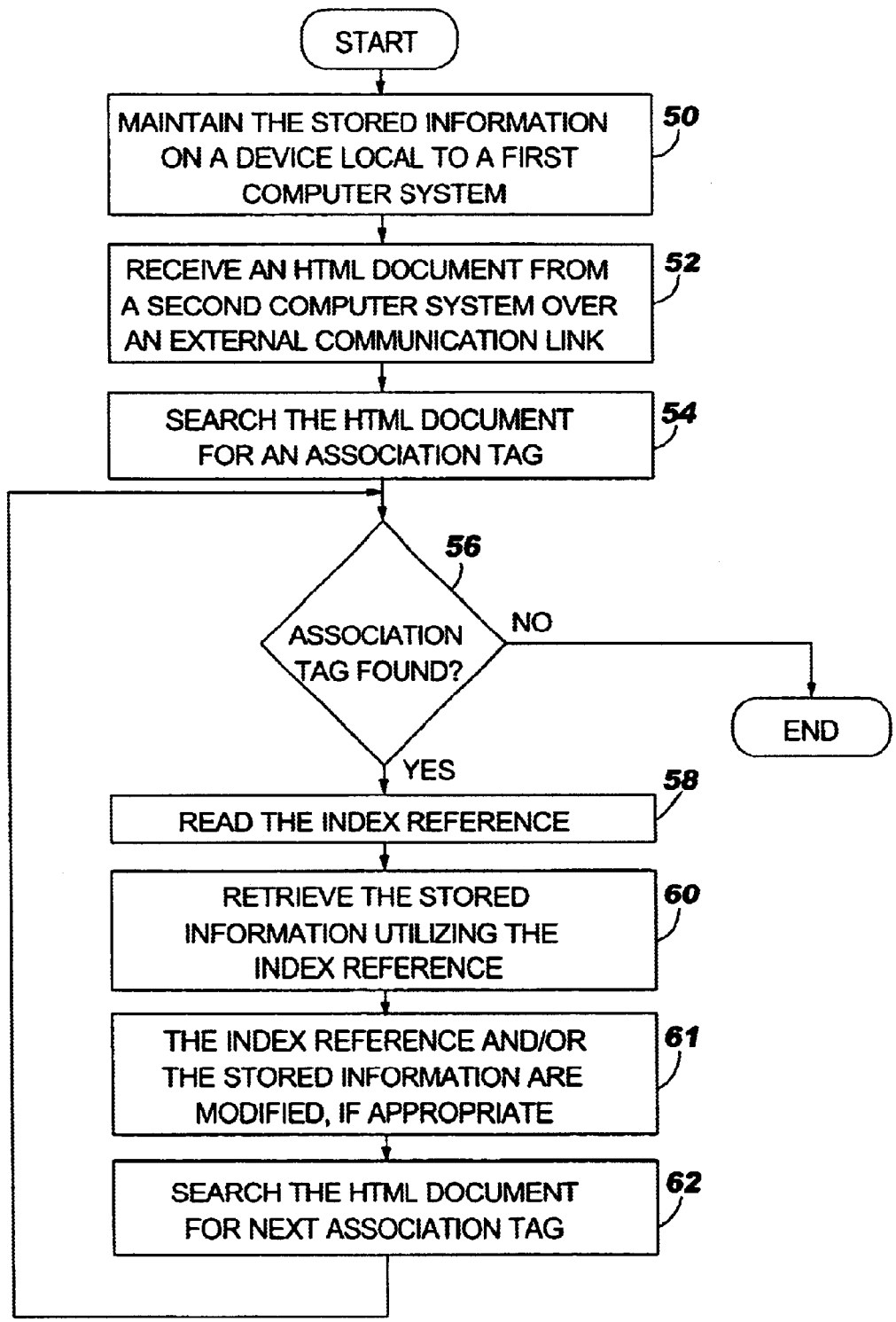

RELATING A HTML DOCUMENT WITH A NON-BROWSER APPLICATION

FIELD OF THE INVENTION

The present invention generally relates to hyper-text markup language (HTML), and more particularly, to tags utilized in HTML documents.

BACKGROUND OF THE INVENTION

The Internet is a collection of interconnected computers that share common communication protocols and languages. These protocols include the hyper-text transfer protocol (HTTP), which is a communication protocol used for communications between clients and servers, and the-transfer control protocol/Internet protocol (TCP/IP), the TCP portion of which is the transport specific protocol for the communication between computers or applications. In addition, the language in which these computers communicate is called hyper-text markup language (HTML). The explosive growth and popularity of the Internet, and more particularly the World Wide Web (hereafter the "Web"), in recent years may be due, at least in part, to the standardization of these communication protocols and languages. Moreover, the growth of the Internet has been aided by the fact that these communication protocols and languages are machine independent, and thereby, allow virtually any conventional computer (e.g., PC, Macintosh® (Apple Computer, Inc.), or UNIX®-based (American Telephone & Telegraph Company)) to be connected to the Internet.

HTML is a markup language that is used to describe the content and format of web pages. A web page (also referred to as an HTML document) is typically an ASCII text document comprising text and embedded HTML formatting commands referred to as tags. A web browser application, such as WebExplorer® (IBM Corporation) or Netscape Navigator® (Netscape Communication Corporation), parses the HTML tags in order to generate an integrated visual display of the web page. In addition to the tags which format the text, a web page can also include reference tags, in terms of a universal resource locator (URL), to a piece of multimedia data, for example, an image, video segment, animation, or audio file. The web browser responds to such a reference tag by retrieving and then displaying or playing the data as an integrated part of the web page. A tag can also create a hyperlink which is a segment of text or an image that refers to another document (e.g., a web page, image, video segment, animation, or audio file) elsewhere on the Web. When the hyperlink is selected, the referenced document is downloaded by the web browser.

An HTML tag typically begins with a left-angle bracket ("<") and ends with a right-angle bracket (">"). Inside the brackets are a tag name (or identifier) and attributes, if appropriate. The tag name usually defines the tag by function and the attributes provide any necessary parameters for the operation of the tag function. For example, the tag "<P>" which defines a paragraph break merely includes the tag name P and no attributes. As another example, a header tag which defines the size and indentation of a heading on the web page can include a start tag such as "<h2 align=center>" and an end tag such as "</h2>". The start tag and the end tag are placed on either side of a text element, i.e., the text comprising the heading. Therefore, the heading of this section of the present patent application would appear as follows in HTML: <h2 align=center>BACKGROUND OF THE INVENTION </h>. It is noted that the start tag includes the attribute "align=" to designate the alignment of the text element. Therefore, as illustrated above, some tags require an end tag while other tags do not.

While the tags described above are embedded into a web page to impart some type of functionality, other tags are declarative in nature. They merely convey information and are not visible when the web page is displayed by a web browser. One example of such tag is a META tag which is used in the head area of an HTML document to specify information about the HTML document for use in identifying, indexing, and cataloging the web page. Another example of a tag that is declarative in nature is the comment tag. The comment tag is identified by an exclamation point and appears as "<! comment>". Another example includes applet tags ("<appl>") for embedding Java applets.

Important to the success of HTML is the Worldwide Web Consortium (W3C) which issues standardized versions of HTML in an effort to facilitate its continued evolution. Accordingly, HTML has been able to meet the demands of the ever changing and expanding Web. However, the utilization of HTML documents has generally been limited to the Web, or at least to web browsers. The utilization of HTML documents outside the context of a web browser has generally been limited. Even though more application programs are beginning to incorporate HTML parsers so that they can operate on HTML documents, the features of HTML are still generally being utilized for formatting text and creating hyperlinks, as in the context of a web browser. Thus, present applications, which operate on HTML documents, view documents utilizing the WWW paradigm of an HTML document as self-contained in that the information to create the document is either transmitted with the document or provided from the source of the document. The present applications generally do not address the need for working or interacting with an HTML document outside of an embedded browser environment.

SUMMARY OF THE INVENTION

In view of the above discussion, it is an object of the present invention to relate stored information to an HTML document.

Another object of the present invention is to reduce the processing overhead of an application program operating on an HTML document by relating stored information that defines an aspect of the HTML document to the HTML document for use by the application program in operating on the HTML document.

Yet another object of the present invention is to provide reduced transmission overhead by storing information locally that is related to an HTML document so that the information does not have to be transmitted with the HTML document over an external communication link.

These and other objects are accomplished, according to the present invention, by systems, methods and computer program products configured for relating an HTML document to stored information that is associated with the HTML document and with an application program, wherein the application program retrieves the stored information for use in performing an operation on the HTML document. An advantageous implementation of the present invention is for storing information locally that is document and application specific so that the information does not have to be recomputed for each invocation of the application program. Yet another advantageous implementation of the present invention is for storing information locally so that the information does not have to be transmitted with the HTML document between computer systems over external communication links. Another advantageous implementation of the present invention is for storing the state of a document (i.e., whether it has been altered) without revealing that the state has been stored.

An embodiment of the present invention for relating an HTML document to stored information that is associated with the HTML document and with an application program includes searching the HTML document for an association tag, wherein the association tag includes an index reference that can be utilized to locate the stored information. In addition, the index reference may be read and the stored information retrieved utilizing the index reference. The retrieved information can then be utilized by the application program.

In a further embodiment of the present invention, the stored information is maintained on a local device accessible by the application program. This eliminates the need of having to transmit the stored information with the HTML document thereby reducing transmission overhead. This also enables information that is particular to a version of the HTML document as it existed when it was last operated on by the application program to remain locally stored and associated with the HTML document.

In a particular embodiment of the present invention, the search for the association tag includes searching for a marker identifying the association tag as being associated with the application program. This unique marker identifying the association tag may ensure faster and more reliable identification of the association tag. In addition, the search may include searching for delimiters and then searching for a marker within the delimiters in order to reduce the likelihood of a false identification of an association tag based upon text not within a tag.

In another aspect of the present invention, the index reference may be modified. The index reference may be modified in order to relocate the stored information locally or, if desired, remotely. In addition, the stored information may also be modified. The stored information may be modified to account for operations performed by the application program. The modifications of the index reference and stored information are preferably performed by the application program.

In still another embodiment of the present invention, the index reference includes reading a filename of a file, an identifier of a memory segment of the file, and an offset into the memory segment. Furthermore, the retrieval of the stored information may include the retrieval of a checksum value, retrieving a canonical form of the HTML document, or a document validation key.

In a further embodiment of the present invention, an association tag may also be embedded in an HTML document. This is typically performed during the first invocation of the application program when operating on the HTML document, wherein the application program initially generates or computes the information. In addition, if the HTML document is transmitted by a first user to a second user that is remotely located, an additional association tag(s) specific to the first user may be embedded into the HTML document.

Other features and advantages of the present invention will become apparent to one with skill in the art upon examination of the following drawings and detailed description. It is intended that all such additional features and advantages be included herein within the scope of the present invention, as defined in the appended claims. Further, as will be appreciated by those of skill in the art, the above described methods of the invention may be provided as apparatus or computer readable program means.

BRIEF DESCRIPTION OF THE DRAWINGS

FIG. 2 is a flowchart of the operation of embedding an association tag;

FIG. 3 is a flowchart of the operation of a first embodiment of the association module of FIG. 1; and FIG. 4 is a flowchart of the operation of a second embodiment of the association module of FIG. 1.

DETAILED DESCRIPTION OF PREFERRED EMBODIMENTS

Figure 1:
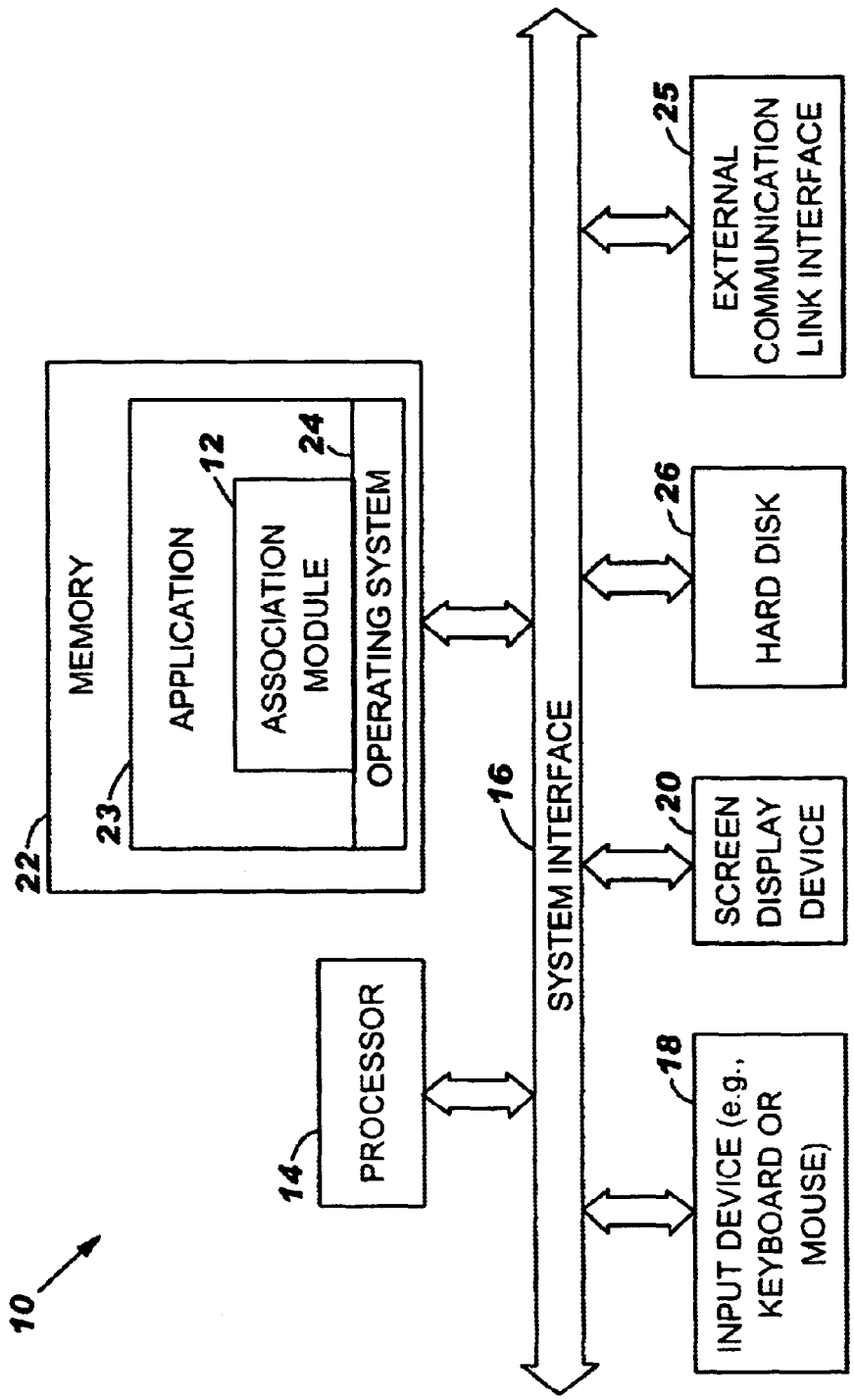
FIG. 1 is a block diagram illustrating an association module in accordance with the present invention situated within a computer-readable medium, for example, in the memory of a computer system.

The present invention now will be described more fully hereafter with reference to the accompanying drawings, in which preferred embodiments of the invention are shown. This invention may, however, be embodied in many different forms and should not be construed as limited to the embodiments set forth herein; rather, these embodiments are provided so that this document will be thorough and complete, and will fully convey the scope of the invention to those skilled in the art. In the drawings, like numerals designate corresponding parts throughout the several views.

In the following description, FIGS. 2, 3 and 4 are flowchart illustrations of methods and systems according to the invention. It will be understood that each block of the flowchart illustrations, and combinations of blocks in the flowchart illustrations, can be implemented by computer program instructions. These computer program instructions may load onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instructions stored in the computer-readable memory produce an article of manufacture including instruction means which implement the functions specified in the flowchart block or blocks. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the function specified in the flowchart block or blocks.

Accordingly, blocks of the flowchart illustrations support combinations of means for performing the specified functions, combinations of steps for performing the specified functions. It will also be understood that each block of the flowchart illustrations, and the combinations of blocks in the flowchart illustrations, can be implemented by special purpose hardware-based computer systems which perform the specified functions or steps, or combinations of special purpose hardware and computer instructions.

FIG. 1 illustrates a computer system 10 which includes an association module 12 in accordance with the present invention. The computer system 10 includes a processor 14 that communicates with the other elements within the computer system 10 via a system interface 16. An input device 18, for example, a keyboard or mouse, is used to input data from the user, and a screen display device 20, for example, a monitor, is used to output data to the user. A memory 22 within the computer system 10 includes an application program 23 and a conventional operating system 24 which communicates with the application program 23 and enables execution of the application program 23 by the processor 14. In accordance with the present invention, the application program 23 includes the association module 12 which, like the application program 23, is executed by the processor 14 via the operating system 24. An external communication link interface 25 is provided to interface the computer system 10 with other computer systems or computerbased machines such as in a local area network (LAN) or a wide area network (WAN). The external communication link interface 25 may be a modem device capable of interfacing with a suitable communication medium such as twisted pair, coaxial cable, cellular, satellite, cordless, etc. Lastly, a hard disk 26 is provided as a persistent memory device, as well known in the industry.

As will be appreciated by one of skill in the art, the association module 12 of the present invention may be embodied as a method, apparatus, or computer program product. Accordingly, the association module 12 may take the form of an entirely hardware embodiment, an entirely software embodiment, or an embodiment combining both software and hardware aspects. Furthermore, the association module may take the form of a computer program product on a computer-readable storage medium having computer-readable program code embodied in the medium thereof. Any suitable computer-readable medium for use by or in connection with a computer system may include an electronic, magnetic, optical, or other physical device or means that can contain or store a computer program for use by or in connection with a computer-related system or method.

The processor 14 may contain one or more processors (not shown) or other computational devices. The memory 22 preferably comprises random access memory or its functional equivalent, including but not limited to DRAM, SRAM, FlashRAM, and VRAM, for storing programs such as application 23, or portions thereof, for quick retrieval during processing by the microprocessor(s) or other computational devices. A portion of the memory 22 and/or the hard disk 26 may be utilized by the processor 14 when executing a program such as application program 23.

The application program 23 can be any suitable computer-executable program configured to act on and/or generate data regarding an HTML document. For illustrative purposes, examples of such application programs include a spell checker program, a grammar analyzer program, a spreadsheet program, and a document verification program. These application programs can operate on HTML documents, or portions thereof, in order to perform specific functions. It is further noted that the application program 23 may be created as a plug-in or as an add-on to a web browser, as referenced in the previous standalone example. However, the application program 23 may be equally as useful to the user as a separate and distinct standalone program.

The association module 12 is a software module component of the application program 23 or may be the application program itself. Thus, the association module 12 may be invoked automatically when the application program 23 is invoked, or alternatively, may be invoked in response to a selection made by the user via the input device 18. When the computer program instructions comprising the association module 12 are not being executed by the processor 14, the association module 12 may reside in memory 22, as shown in FIG. 1, or on the hard disk 26 or the storage media. Likewise, when the computer program instructions comprising the application program 23 are not being executed by the processor 14, the application program 23 may reside in memory 22 as shown in FIG. 1, or on hard disk 26 or the storage media.

In accordance with the present invention, the association module 12 searches for an association tag in an HTML document being operated on by application program 23. An association tag, for purposes of the present disclosure, is a declarative HTML tag that includes a marker and an index reference. An example of an association tag that is implemented as a comment tag is <!marker index reference=xxx.xxx style=invisible>. Because the tag is declarative, it will not be visible when the HTML document is displayed on the screen display device 20. The marker is a unique identifier that is recognized by the association module 12 as denoting an association tag. Specifically, the association module 12 searches through the HTML document for an association tag with the marker.

The index reference can be generally described as an index into a file where stored information, or data, associated with the HTML document is stored. The index reference can be implemented as an offset into a memory location, an offset into a file or an entry identifier such as a record locator in a database. For example, the local index reference may identify a location in memory 22 or on hard disk 26 of the computer system 10. Thus, the association module 12 can retrieve stored information for use by the application program 23 utilizing the index reference.

The operation of the association module 12 according to the present invention is described hereinafter with reference to FIGS. 2, 3 and 4. FIG. 3 is a flowchart describing the operation of the association module 12 in retrieving the stored information related to the HTML document in accordance with a first aspect of the present invention, and FIG. 4 is a flowchart describing the operation of the association module 12 in retrieving the stored information related to the HTML document in accordance with a second aspect of the present invention.

With specific reference to FIG. 2, the application program 23 initially operates on an HTML document and generates information that is specific to that document and that application program 23, as indicated by block 27. The information is stored at a location in memory that can be determined utilizing an index reference, as reflected by block 28. The information may be stored locally in computer system 10 or on another computer system connected to computer system 10. At block 29, an association tag is embedded in the HTML. The association tag preferably includes a marker that identifies the tag and the index reference for retrieving the stored information. The operation of the association module 12 when the application program 23 operates on the HTML.

With specific reference to FIG. 3, the association module 12 searches for an association tag in an HTML document being operated on by the application program 23, as indicated by block 30. This may include searching for a marker identifying the tag as an association tag, or alternatively, in order to decrease false detection of the marker, this may include searching for tag delimiters and then searching within the delimiters for the marker. If an association tag is found at block 32, then the association module 12 reads the index reference, as reflected by block 34.

As indicated above, the index reference may take many forms, including but not limited to, an index, a file name, an associated memory offset, or database record. Thus, the index reference may provide an offset into the application data file or some other designated file where the stored information resides between invocations of the association module 12. When the stored information is maintained locally, the index reference can be a pointer into the application program's data segment, or into a data area specifically reserved by the operating system, thereby improving the performance in accessing the stored information. Alternatively, the information can be transmitted along with the HTML document between remotely located computer systems in order to allow persistent use of the information.

Utilizing the index reference read at block 34, the association module 12 retrieves the stored information, as indicated by block 36. In accordance with the present invention, the stored information maybe both document and application specific information or data related to the HTML document. Thus, the information retrieved by the association module 12 can take many different forms such as a checksum value, a canonical form of the HTML document, or a document validation key. Once the information has been retrieved by the association module 12, the stored information is utilized by the application program 23, as reflected by block 38. Depending upon the makeup of the stored information, the nature of use of the information by the application program 23 may vary, as would be obvious to one skilled in the art. The index reference and/or the stored information may be modified, if appropriate, as reflected by block 39. The index reference may be modified to change the location of the stored information. For example, if the application program 23 detects that the HTML document has been modified since the application program's last invocation, the index reference may be modified to an updated location. In addition, the stored information may be modified to include information regarding a current state of the HTML document. For example, if the application program 23 were a spell checker program, the stored information might identify each misspelled word(s), and therefore, this information may change if the HTML document is changed. At block 40, the association module 12 searches the HTML document for another association tag, and substantially the same process is repeated.

With specific reference to FIG. 4, block 50 indicates that the association module 12 maintains the stored information on a device local to a first computer system. This may be, for instance, at memory 22 or hard disk 26. At block 52, an HTML document is received from a second computer system over an external communication link via the external communication link interface 25. The association module 12 then searches the HTML document for an association tag, as indicated by block 54. In the event an association tag is found at block 56, the association module 12 reads the index reference as indicated by block 58. Once the index reference is read at block 58, the association module 12 retrieves the stored information utilizing the index reference and provides that information to the application program 23, as is indicated by block 60. The index reference and/or the stored information may be modified, if appropriate, as reflected by block 61. The association module 12 then searches the HTML document for another association tag at block 62, and substantially the same process is repeated.

For purposes of illustrating the functionality of the present invention, the following discussion provides three embodiments of an application program 23 which utilizes an association module 12 in accordance with the present invention. These embodiments will be discussed with reference to the flowchart of FIGS. 2 and 3 for illustrative purposes, though one skilled in the art would recognize that these embodiments are equally well suited for operation in accordance with the flowchart of FIG. 4. The first embodiment is a spell checker program, the second embodiment is a grammar analyzer program, and the third embodiment is a document validation program.

In the first embodiment, the application program 23 is a spell checker program as is commonly used with word processors and e-mail programs. Typically, the user initiates a spell check operation on a document, such as an HTML document in the case of the present invention. The spell checker program then scans through the HTML document confirming that each word constitutes a properly spelled word. Those which do not meet this criteria are identified and the user is typically prompted with several suggested replacements. Upon completing the spell check operation, the spell checker program computes data (block 27, FIG. 2) identifying each misspelled word and its location within the HTML document. This information is then stored (block 28) and an association tag embedded (block 29) in the HTML document with a unique marker associated with the spell checker program and an index reference that can be utilized to retrieve the stored data. At the next invocation of the spell checker program, the association tag is located (block 30, FIG. 3) and processed to retrieve the stored information (block 36) for use by the spell checker program (block 38). This reduces the processing overhead of the spell checker program since it does not have to recompute the stored information. If the HTML document is modified by the spell checker program, then the stored information may be modified (block 33) with updated information that reflects a current state of the HTML document for use the next time the spell checker program operates on the HTML document.

In the second embodiment, the application program 23 is a grammar analyzer as is also commonly used in conjunction with a word processor or e-mail program. A grammar analyzer will typically take a sentence or paragraph at a time and analyze its syntactical form. Once the sentence or paragraph has been analyzed, certain computed information (block 27, FIG. 2) regarding the sentence may be stored (block 28) as data so that the sentence or paragraph does not have to be re-analyzed at each invocation of the grammar analyzer program. Therefore, for each analyzed sentence or paragraph, the grammar analyzer program embeds an association tag (block 29) with a unique marker associated with the grammar analyzer and an index reference that can be utilized to retrieve the information computed at the last invocation of the grammar analyzer. Thus, in a subsequent invocation of the grammar analyzer, the grammar analyzer searches (block 30, FIG. 3) through the HTML document for the association tag associated with the grammar analyzer. For each association tag located, the stored information is retrieved (block 36) for use by the grammar analyzer (block 38). This reduces processing overhead of the grammar analyzer since it does not have to recompute the stored information. As with the spell checker program, the stored information may also change each time the grammar analyzer operates on the HTML. Consequently, the stored information may likewise change (block 33) to reflect a current state of the HTML document.

Lastly, in the third embodiment, the application program 24 is a document validation program that verifies certain properties of an HTML document such as the creator or originality (i.e., that the HTML document is not a copy and/or has not been altered). Therefore, in a system where the data transmission is secured from end to end, such as in an internal network, the user may still wish to verify that the document was actually created by the indicated person and/or that the document is the original version and not an altered version or copy. For example, at a first computer system, a document may be created and the application program run to create a first key. The first key is then encrypted at the first computer system and an association tag is embedded into the document to relate it to the encrypted first key. The document may then be transmitted to a second computer system via a secure line. At the second computer, the encrypted first key is retrieved and decrypted. The document is then validated by running the application program at the second computer system to create a second key, and comparing the second key with the first key from the first computer system.

The foregoing is illustrative of the present invention and is not to be construed as limiting thereof. Although a few exemplary embodiments of this invention have been described, those of skill in the art would readily appreciate that many modifications and variations are possible in the exemplary embodiments without materially departing from the novel teachings and advantages of this invention. Accordingly, all such modifications and variations are intended to be included within the scope of this invention as defined in the claims. In the claims, means-plus-function clauses are intended to cover the structure described herein as performing their recited functions and not only structural equivalents but also equivalent structures.

That which is claimed is:

1. A method for relating a hyper-text markup language (HTML) document to stored information that is associated with the HTML document and with a non-browser application program that is external of the browser, comprising the steps of:

computing the information associated with the HTML document utilizing the non-browser application program;

storing the computed information in a location accessible by an index reference;

searching the HTML document for an association tag, wherein the association tag includes the index reference;

reading the index reference;

retrieving the stored information that is associated with the HTML document and with the non-browser application program that is external of the browser utilizing the index reference; and providing the retrieved information that is associated with the HTML document and with the non-browser application program that is external of the browser to an instance of the non-browser application program for utilization by the non-browser application program that is external of the browser to operate on the HTML document, such that the non-browser application program that is external of the browser need not recompute the stored information that is associated with the HTML document and with the non-browser application program that is external of the browser.

2. The method of claim 1, further comprising the step of maintaining the stored information on a local device accessible by the non-browser application program.

3. The method of claim 1, wherein the step of searching for the association tag includes the step of searching for a marker identifying the association tag as being associated with the non-browser application program.

4. The method of claim 1, further comprising the step of modifying the index reference.

5. The method of claim 1, further including the step of modifying the stored information.

6. The method of claim 1, wherein said step of reading said index reference includes reading a filename of a file, an identifier of a memory segment of the file, and an offset into the memory segment.

7. The method of claim 1, wherein said step of retrieving the stored information includes retrieving a checksum value.

8. The method of claim 1, wherein said step of retrieving the stored information includes retrieving a canonical form of the HTML document.

9. The method of claim 1, wherein said step of retrieving the stored information includes retrieving a document validation key.

10. The method of claim 1, wherein said step of reading the index reference includes reading data defining aspects of the HTML document.

11. The method of claim 3, wherein said step of searching the HTML document includes the steps of:

searching for the HTML document delimiters; and searching the HTML document for the marker within said delimiters.

12. The method of claim 1, further comprising the step of embedding an association tag in the HTML document.

13. The method of claim 1, wherein said association tag is a declarative HTML tag.

14. An apparatus for relating a hyper-text markup language (HTML) document to stored information that is associated with the HTML document and a non-browser application program that is external of the browser, comprising:

means for computing the information associated with the HTML document utilizing the non-browser application program;

means for storing the computed information in a location accessible by an index reference;

means for searching the HTML document for an association tag, wherein the association tag includes an index reference to a location of the stored information that is associated with the HTML document and with the non-browser application program that is external of the browser;

means for reading the index reference;

means for retrieving the stored information that is associated with the HTML document and with the non-browser application program that is external of the browser utilizing the index reference; and means for utilizing the retrieved information that is associated with the HTML document and with the non-browser application program that is external of the browser by the non-browser application program that is external of the browser, such that the non-browser application program that is external of the browser need not recompute the stored information that is associated with the HTML document and with the non-browser application program that is external of the browser upon invocation of the non-browser application program that is external of the browser to operate on the HTML document.

15. A computer program product for relating a hyper-text markup language (HTML) document to stored information that is associated with the HTML document and a non-browser application program that is external of the browser, wherein said application resides on a first computer that communicates with a remotely located second computer over an external communication link, the computer program product comprising:

a computer-readable storage medium having computer-readable program code means embodied in said medium, said computer-readable program code means comprising:

computer-readable program code means for computing the information associated with the HTML document utilizing the non-browser application program;

computer-readable program code means for storing the computed information in a location accessible by an index reference;

computer readable program code means for searching the HTML document for an association tag, wherein the association tag includes an index reference to a location of the stored information that is associated with the HTML document and the non-browser application program that is external of the browser;

computer readable program code means for reading the index reference;

computer readable program code means for retrieving the stored information that is associated with the HTML document and with the non-browser application program that is external of the browser utilizing the index reference; and computer readable program code means for utilizing the retrieved information that is associated with the HTML document and the non-browser application program that is external of the browser by the non-browser application program that is external of the browser, such that the non-browser application program that is external of the browser need not recompute the stored information that is associated with the HTML document and with the non-browser application program that is external of the browser upon invocation of the non-browser application program that is external of the browser to operate on the HTML document.

16. A method according to claim 1, wherein the index reference which is included in the association tag comprises at least one of a memory offset and a reference locator of a database.

17. A method according to claim 1, wherein the association tag further specifies the non-browser application associated with the stored information.

18. A system according to claim 14, wherein the index reference which is included in the association tag comprises at least one of a memory offset and a reference locator of a database.

19. A system according to claim 14, wherein the association tag further specifies the non-browser application associated with the stored information.

20. A computer program product according to claim 15, wherein the index reference which is included in the association tag comprises at least one of a memory offset and a reference locator of a database.

21. A computer program product according to claim 15, wherein the association tag further specifies the non-browser application associated with the stored information.

* * * * *